United States Patent
Schultz et al.

(10) Patent No.: US 11,189,569 B2
(45) Date of Patent: Nov. 30, 2021

(54) POWER GRID LAYOUT DESIGNS FOR INTEGRATED CIRCUITS

(71) Applicants: Advanced Micro Devices, Inc., Sunnyvale, CA (US); ATI Technologies ULC, Markham (CA)

(72) Inventors: Richard T. Schultz, Fort Collins, CO (US); Regina Tien Schmidt, Milpitas, CA (US); Derek P. Peterson, Mississauga (CA); Te-Hsuan Chen, Waltham, MA (US); Elizabeth C. Conrad, Sunnyvale, CA (US); Catherina Simona Matheis Ionescu, Santa Clara, CA (US); Chu-Wen Wang, San Jose, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 15/275,028

(22) Filed: Sep. 23, 2016

(65) Prior Publication Data

US 2018/0090440 A1    Mar. 29, 2018

(51) Int. Cl.
*H01L 23/528* (2006.01)
*H01L 27/118* (2006.01)
(Continued)

(52) U.S. Cl.
CPC ........ *H01L 23/5286* (2013.01); *G06F 30/392* (2020.01); *G06F 30/394* (2020.01);
(Continued)

(58) Field of Classification Search
CPC ............. H01L 23/5286; H01L 27/0207; H01L 23/5223; H01L 23/5226; H01L 27/11807
See application file for complete search history.

(56) References Cited

U.S. PATENT DOCUMENTS 5,889,329 A    3/1999   Rostoker et al.
9,837,398 B1   12/2017  Rowhani et al.
(Continued)

FOREIGN PATENT DOCUMENTS

| JP | 2007324409 A | 12/2007 |
| JP | 2014060355 A | 4/2014 |
| WO | WO2007073599 A1 | 7/2007 |

OTHER PUBLICATIONS

Schultz, Richard T., U.S. Appl. No. 15/965,311, entitled "Metal Zero Contact Via Redundancy On Dutput Nodes and Inset Power Rail Architecture", filed Apr. 27, 2018, 36 pages.
(Continued)

*Primary Examiner* — Sue A Purvis
*Assistant Examiner* — Scott Stowe
(74) *Attorney, Agent, or Firm* — Kowert Hood Munyon Rankin and Goetzel PC; Rory D. Rankin

(57) ABSTRACT

Integrated circuit layouts are disclosed that include metal layers with metal tracks having separate metal sections along the metal tracks. The separate metal sections along a single track may be electrically isolated from each other. The separate metal sections may then be electrically connected to different voltage tracks in metal layers above and/or below the metal layer with the separate metal sections. One or more of the metal layers in the integrated circuit layouts may also include metal tracks at different voltages (e.g., power and ground) that are adjacent to each other within a power grid layout. The metal tracks may be separated by electrically insulating material. The metal tracks and the electrically insulating material between the tracks may create capacitance in the power grid layout.

20 Claims, 12 Drawing Sheets

(51) Int. Cl.
  *G06F 30/392* (2020.01)
  *G06F 30/394* (2020.01)
  *H01L 23/522* (2006.01)
  *H01L 27/02* (2006.01)
  *H01L 49/02* (2006.01)

(52) U.S. Cl.
  CPC ...... *H01L 23/5223* (2013.01); *H01L 23/5226* (2013.01); *H01L 27/0207* (2013.01); *H01L 27/11807* (2013.01); *H01L 28/60* (2013.01); *H01L 2027/11811* (2013.01)

(56) References Cited

U.S. PATENT DOCUMENTS

| | | |
|---|---|---|
| 2005/0212562 A1 | 9/2005 | Gliese et al. |
| 2007/0157144 A1 | 7/2007 | Mai et al. |
| 2007/0278528 A1 | 12/2007 | Ato et al. |
| 2009/0187871 A1 | 7/2009 | Cork |
| 2010/0148219 A1 | 6/2010 | Shimizu |
| 2013/0087834 A1 | 4/2013 | Park et al. |
| 2013/0126978 A1 | 5/2013 | Becker et al. |
| 2013/0155753 A1 | 6/2013 | Moon et al. |
| 2013/0334613 A1 | 12/2013 | Moroz |
| 2014/0145342 A1 | 5/2014 | Schultz et al. |
| 2014/0264742 A1 | 9/2014 | Yen et al. |
| 2016/0276287 A1 | 9/2016 | Iwabuchi |
| 2017/0011999 A1* | 1/2017 | Heo ................... H01L 23/5286 |
| 2017/0154848 A1 | 6/2017 | Fan et al. |
| 2017/0352649 A1 | 12/2017 | Pant et al. |
| 2018/0183414 A1 | 6/2018 | Guo et al. |
| 2019/0065650 A1 | 2/2019 | Pelloie |
| 2019/0103394 A1 | 4/2019 | Andrews et al. |

OTHER PUBLICATIONS

International Search Report and Written Opinion in International Application No. PCT/US2017/052775, dated Mar. 26, 2018, 17 pages.

International Search Report and Written Opinion in International Application No. PCT/US2018/052369, dated Jan. 7, 2019, 16 pages.

Schultz, Richard T., U.S. Appl. No. 15/819,879, entitled "Metal Zero Power Ground Stub Route To Reduce Cell Area and Improve Cell Placement At the Chip Level", filed Nov. 21, 2017, 28 pages.

Non-Final Office Action in U.S. Appl. No. 15/819,879, dated Mar. 18, 2019, 10 pages.

Notice of Allowance in U.S. Appl. No. 15/965,311, dated Jun. 5, 2019, 8 pages.

Final Office Action in U.S. Appl. No. 15/819,879, dated Oct. 11, 2019, 12 pages.

Non-Final Office Action in U.S. Appl. No. 15/819,879, dated Jan. 30, 2020, 11 pages.

Final Office Action in U.S. Appl. No. 15/819,879, dated Oct. 27, 2020, 13 pages.

First Examination Report in Indian Patent Application No. 201917004997, dated Aug. 2, 2021, 6 pages.

Non-Final Office Action in Japanese Patent Application No. 2019-515884, dated Oct. 5, 2021, 11 pages.

Communication pursuant to Article 94(3) EPC in European Application No. 17778427.9, dated Oct. 14, 2021, 4 pages.

* cited by examiner

POWER GRID LAYOUT DESIGNS FOR INTEGRATED CIRCUITS

BACKGROUND

Description of the Related Art

As the size of the individual transistors has steadily decreased through advances in process development and the need to increase feature density. Current scaling is progressing towards 7 nm and beyond technologies with electromigration and IR (voltage) drop becoming more concerning as scaling progresses downward. These technologies are continuously challenged on logic scaling versus cost. Attempts to improve routing congestion and cell placement may be able to make a difference on whether a selected technology may be cost effectively implemented or not.

These technologies typically use unidirectional metal features (e.g., metal tracks or metal rails). Unidirectional metal features, however, create challenges for efficient cell placement and power routing within integrated circuit layouts as the pitch of the metal rails gets tighter and takes up more of the routing tracks available for placement of cells. Thus, as feature density increases, there is a continual need to create better cell placement designs and provide better routing efficiency in integrated circuit layouts such as power grid layouts.

FIG. 1A depicts a top view representation of an embodiment of a typical integrated circuit layout with two stacked metal layers. Integrated circuit layout 100 includes a first metal layer with metal tracks 102. Layout 100 also includes a second metal layer with metal tracks 104. Metal tracks 102 may be coupled to metal tracks 104 with via connections 106. Via connections 106 may be vias or other electrical connections through an insulating layer between the metal layers.

In certain integrated circuit layouts, as shown in FIG. 1B, layout 100 includes alternating rows of metal tracks 102A, 102B in the first metal layer. Metal tracks 102A may be ground tracks (e.g., Vss tracks) while metal tracks 102B are power (supply) tracks (e.g., Vdd tracks). The second metal layer may then include metal tracks 104A that connect to metal tracks 102A and metal tracks 104B that connect to metal tracks 102B. As shown in FIG. 1B, via connections 106 are made accordingly to connect the corresponding metal tracks.

A problem with using two side-by-side metal tracks, as shown in FIGS. 1A and 1B, is that a standard cell has metal pins in the second metal layer that do not allow placement of the standard cell under the side-by-side metal tracks. FIG. 2 depicts a representation of an embodiment of standard cell 110 with metal pins 112. Metal pins 112 may be formed as part of the second metal layer for standard cell 110. Standard cell 110 may have one empty track 114 but the presence of metal pins 112 may prevent the standard cell from readily fitting under metal tracks 104A and 104B, shown in FIG. 1B. Because standard cell 110 is prevented from fitting under metal tracks 104A and 104B, there is less room for the standard cells when the side-by-side metal tracks are used. Thus, there is a need for a layout that provides power and ground tracks in metal layers while providing room for standard cells.

Additionally, traditional decoupling capacitors are typically built separate from a power grid. These decoupling capacitors may take up precious area on the integrated circuit and more decoupling capacitors are usually better for a design. Thus, there is a need to provide decoupling capacitance without occupying area in the integrated circuit layout.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 3A:
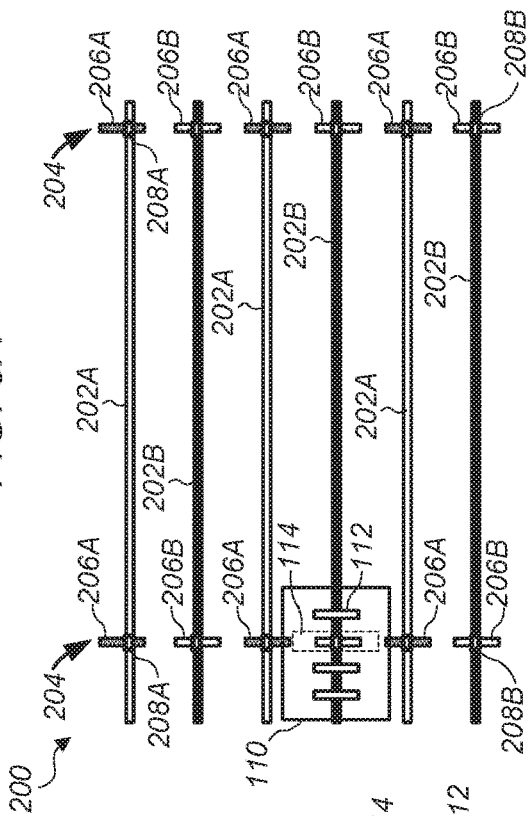
FIG. 3A depicts a top view representation of an embodiment of an integrated circuit layout with two stacked metal layers.

FIG. 3A depicts a top view representation of an embodiment of an integrated circuit layout with two stacked metal layers. In certain embodiments, integrated circuit layout 200 includes metal tracks 202 in a first metal layer and metal tracks 204 in a second metal layer. The first metal layer and the second metal layer may be separated by an insulating layer. In certain embodiments, the first metal layer is the bottom metal layer in the integrated circuit (e.g., the first metal layer above the active layer). As shown in FIG. 3A, tracks 202 are "horizontal" tracks and tracks 204 are "vertical" tracks. It is to be understood that the orientation of the tracks is representative of one embodiment of the orientation of the tracks and that other orientations may be possible (e.g., tracks 202 are "vertical" and tracks 204 are "horizontal").

Figure 1A:
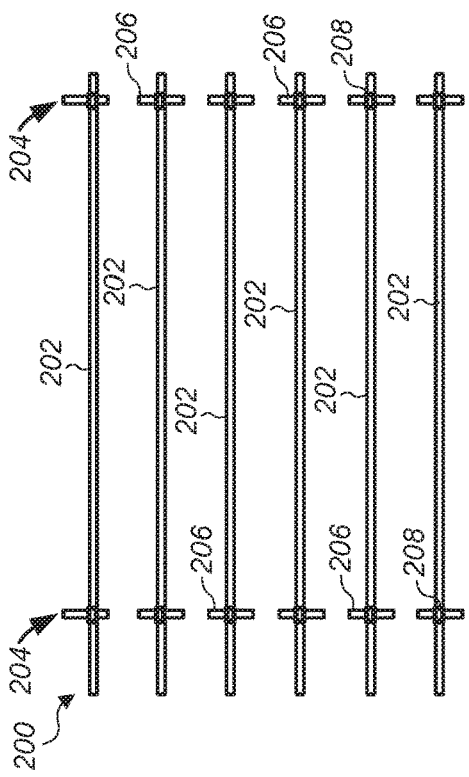
FIG. 1A depicts a top view representation of an embodiment of a typical integrated circuit layout with two stacked metal layers.

As shown in FIG. 3A, layout 200 includes single tracks 204 in the second metal layer separated by a pitch distance between the tracks (e.g., tracks 204 are not "side-by-side" track in the second metal layer, as shown in FIG. 1A). In certain embodiments, tracks 204 include separate metal sections 206 along the length of the tracks. Metal sections 206 may be electrically isolated from each other along the length of tracks 204. Thus, tracks 204 are single metal rails "cut" along their length to form separate metal sections 206. Metal sections 206 along tracks 204 may be formed using process technologies known in the art.

In certain embodiments, metal sections 206 are formed to be positioned over tracks 202 in the first metal layer. Tracks 202 may be continuous metal tracks. For example, tracks 202 are metal that runs continuously along the length of the tracks in the first metal layer. Via connections 208 may be used to connect metal sections 206 to portions of the metal in tracks 202 positioned below the metal sections 206 (e.g., through an insulating layer between the metal layers). Thus, each metal section 206 has a distinct or separate connection to a portion of track 202 below the metal section (e.g., each metal section in track 204 is individually connected to the portion of track 202 below the metal section).

Figure 1B:
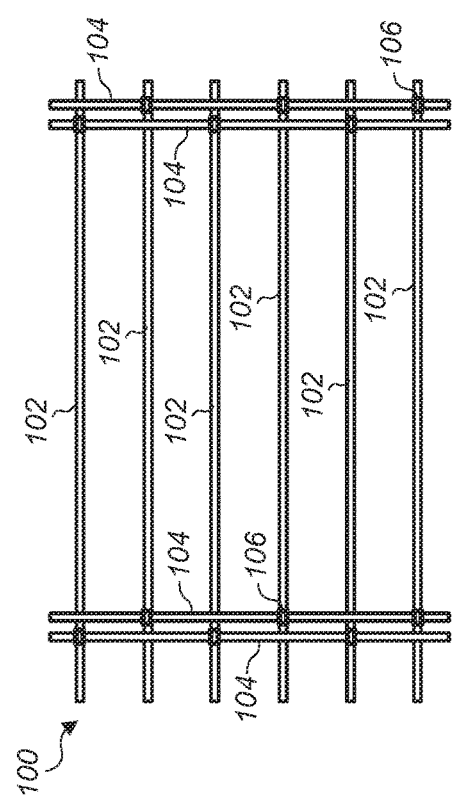
FIG. 1B depicts a top view representation of an embodiment of a typical integrated circuit layout with power and ground connections in two stacked metal layers.
Figure 3B:
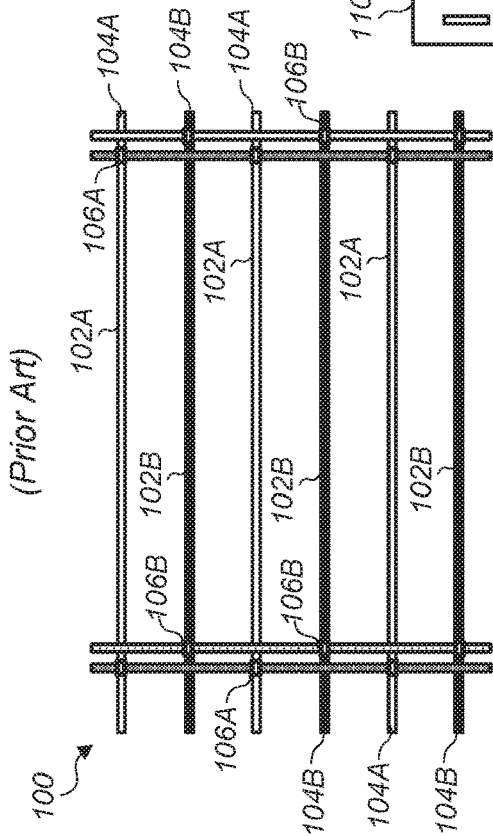
FIG. 3B depicts a top view representation of an embodiment of an integrated circuit layout with power and ground connections in two stacked metal layers.

Because metal sections 206 are electrically isolated and individually connect to the portion of track 202 below each metal section, metal sections 206 may be used to provide different power connections along a single metal track 204. FIG. 3B depicts a top view representation of an embodiment of integrated circuit layout 200 with power and ground connections in the two stacked metal layers. In certain embodiments, layout 200 includes alternating rows of metal tracks 202A, 202B in the first metal layer (similar to the layout depicted in FIG. 1B). As shown in FIG. 3B, metal tracks 202A may be ground tracks (e.g., Vss tracks) while metal tracks 202B are power (supply) tracks (e.g., Vdd tracks).

In certain embodiments, metal sections 206A are connected to metal tracks 202A with via connections 208A and metal sections 206B are connected to metal tracks 202B with via connections 208B. Thus, metal sections 206A route ground voltage in the second metal layer and metal sections 206B route power voltage in the second metal layer in the same metal track (metal track 204). Thus, power and ground are routed on the same pitch in the second metal layer in the single metal track 204.

Figure 2:
FIG. 2 depicts a representation of an embodiment of a standard cell with metal pins.

Having separate metal sections 206A, 206B in the second metal layer allows single metal tracks 204 to be used for routing ground and power voltage in the second metal layer. The single metal tracks 204 may provide more room for standard cells (e.g., standard cell 110 shown in FIG. 2) inside layout 200. For example, as shown in FIG. 3B, empty track 114 may be positioned to overlap with metal track 204 and the absence of additional metal tracks in standard cell 110 allows the standard cell with metal pins 112 in the first metal layer to fit under the single metal track 204.

Figure 4:
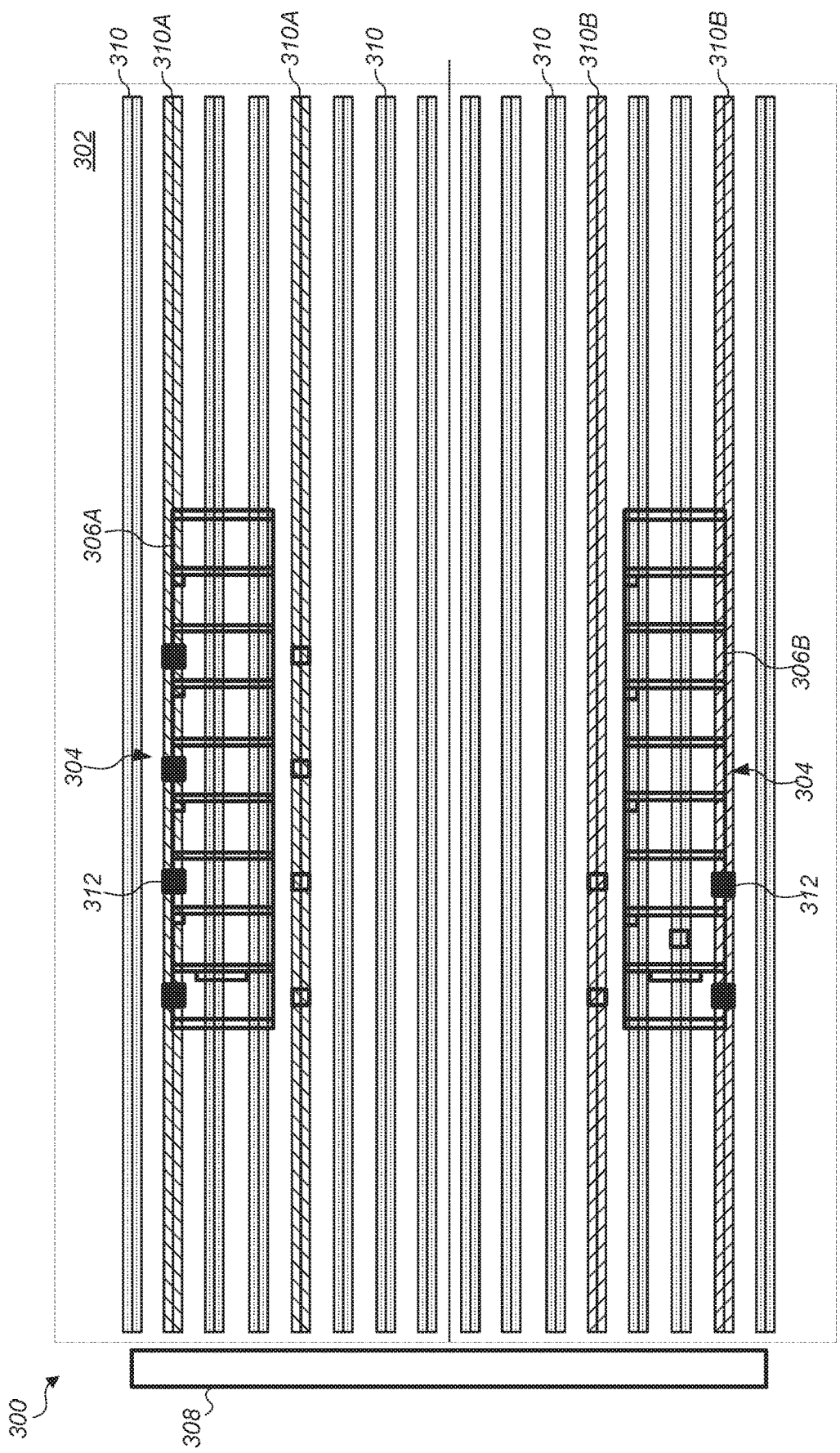
FIG. 4 depicts a top view representation of an embodiment of a first metal layer in an integrated circuit layout.

FIGS. 4-13 depict top view representations of embodiments of metal layers that may be used in an integrated circuit layout or a power grid layout for an integrated circuit. It is to be understood that the metal layers depicted in FIGS. 4-13 may be separated by one or more insulating layers and/or other layers as is known in the art. FIG. 4 depicts a top view representation of an embodiment of a first metal layer in an integrated circuit layout. Integrated circuit layout 300 includes first metal layer 302. First metal layer 302 may be positioned above active layer 304. Active layer 304 may include, for example, diffusion layers 306 for transistors beneath first metal layer 302. In some embodiments, diffusion layers 306A are part of a row of PMOS transistors while diffusion layers 306B are part of a row of NMOS transistors.

FIG. 4 depicts single cell row 308 (with a height shown by the rectangle) of first metal layer 302 with a plurality of parallel metal tracks 310. In certain embodiments, metal tracks 310 inside the boundary of cell 308 (e.g., tracks that do not straddle the edge or boundary of the cell and/or track that are not shared with another cell) are used as power tracks (e.g., Vdd tracks) and ground tracks (e.g., Vss tracks). For example, as shown in FIG. 4, tracks 310A are used as power tracks for diffusion layers 306A in the row of PMOS transistors and tracks 310B are used as ground tracks for diffusion layers 306B in the row of NMOS transistors.

Tracks 310A and 310B may straddle the row of PMOS transistors and the row of NMOS transistors, respectively. Tracks 310A and 310B may be connected to active layer 304 using via connections 312. Having tracks 310A and 310B straddle the transistors may minimize the IR (voltage) drop in getting power to where it is used (e.g., in the transistors). Thus, the placement of tracks 310A and 310B shown in FIG. 4 may be used to more efficiently provide power and ground to the transistors.

Figure 5:
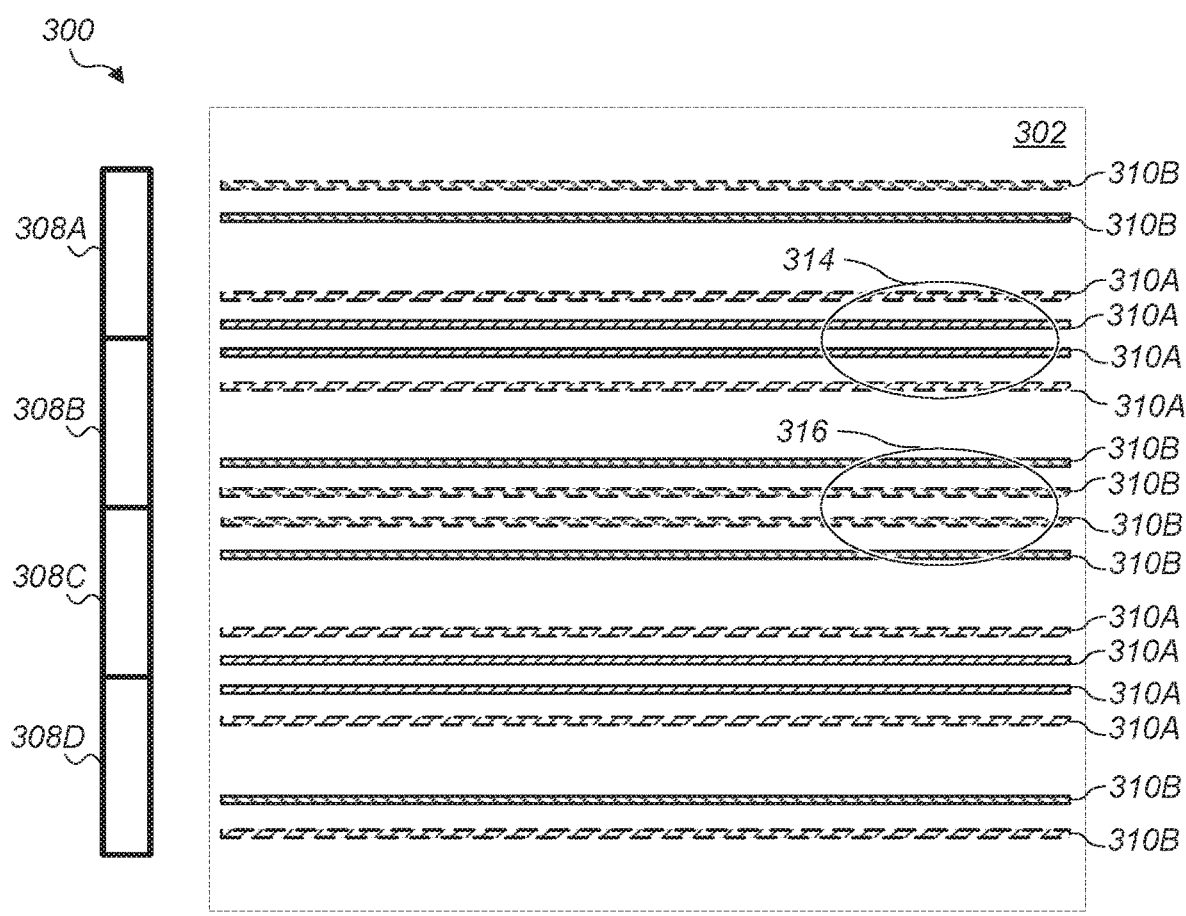
FIG. 5 depicts a top view representation of an embodiment of four cell rows of a first metal layer in an integrated circuit layout.

FIG. 5 depicts a top view representation of an embodiment of four cell rows 308 of first metal layer 302 in integrated circuit layout 300. In certain embodiments, as shown in FIG. 5, each cell row 308 includes two tracks 310A and two tracks 310B. Thus, each cell row 308 may have ground and power tracks that straddle the transistors below first metal layer 302.

In certain embodiments, each cell row 308 has tracks that are flipped in relation to the tracks in its adjacent cell rows. For example, cell rows 308B and 308D have tracks 310A in the upper portion of the cell rows and tracks 310B in the lower portion of the cell rows (similar to the embodiment of cell row 308 depicted in FIG. 4). Cell rows 308A and 308C have tracks 310B in the upper portion of the cell rows and tracks 310A in the lower portion of the cell rows. Alternating the location of the tracks in the cell rows, as shown in FIG. 5, allows similar tracks (e.g., tracks 310A or tracks 310B) in adjacent cell rows to be clustered together near the cell border. For example, tracks 310A are clustered together as shown by oval 314 and tracks 310B are clustered together as shown by oval 316. Clustering the similar tracks together may provide a layout that allows more efficient coupling to the tracks as described herein.

In certain embodiments, one or more routing tracks are placed between tracks 310A and/or tracks 310B in first metal layer 302. The routing tracks are not shown for simplicity in the drawing. It is to be understood that a varying number of routing tracks between tracks 310A and/or 310B may be used depending on a desired design for integrated circuit layout 300.

Figure 6:
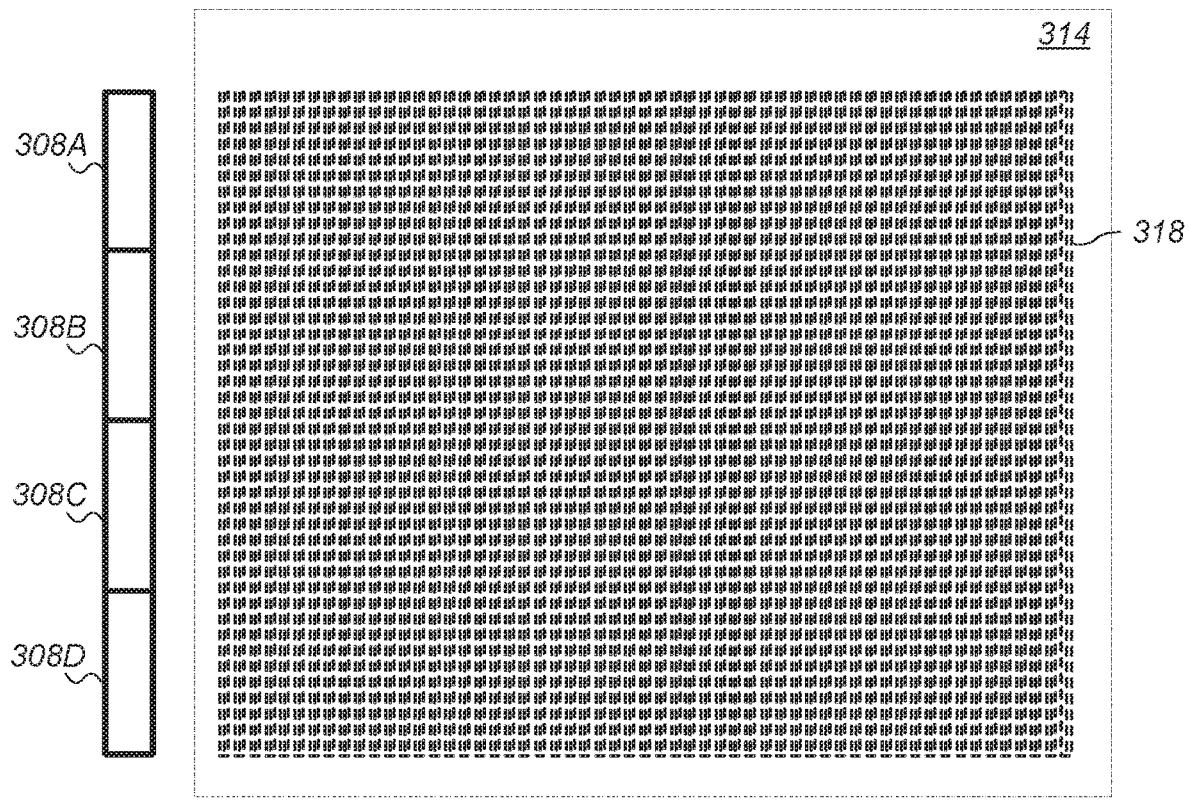
FIG. 6 depicts a top view representation of an embodiment of a second metal layer in an integrated circuit layout.

FIG. 6 depicts a top view representation of an embodiment of second metal layer 314 in integrated circuit layout 300. Second metal layer 314 may include plurality of tracks 318. Tracks 318 may be oriented in a direction perpendicular to tracks 310 in first metal layer 302. In certain embodiments, tracks 318 have no predesignated power or ground connections. Thus, power or ground connections may be provided where they are needed along tracks 318. For example, tracks 318 may be shared tracks (e.g., continuous metal tracks) or tracks with separated metal sections (e.g., unshared tracks with separate or distinct connections). In some embodiments, one or more of tracks 318 are not used for any connection.

Figure 7:
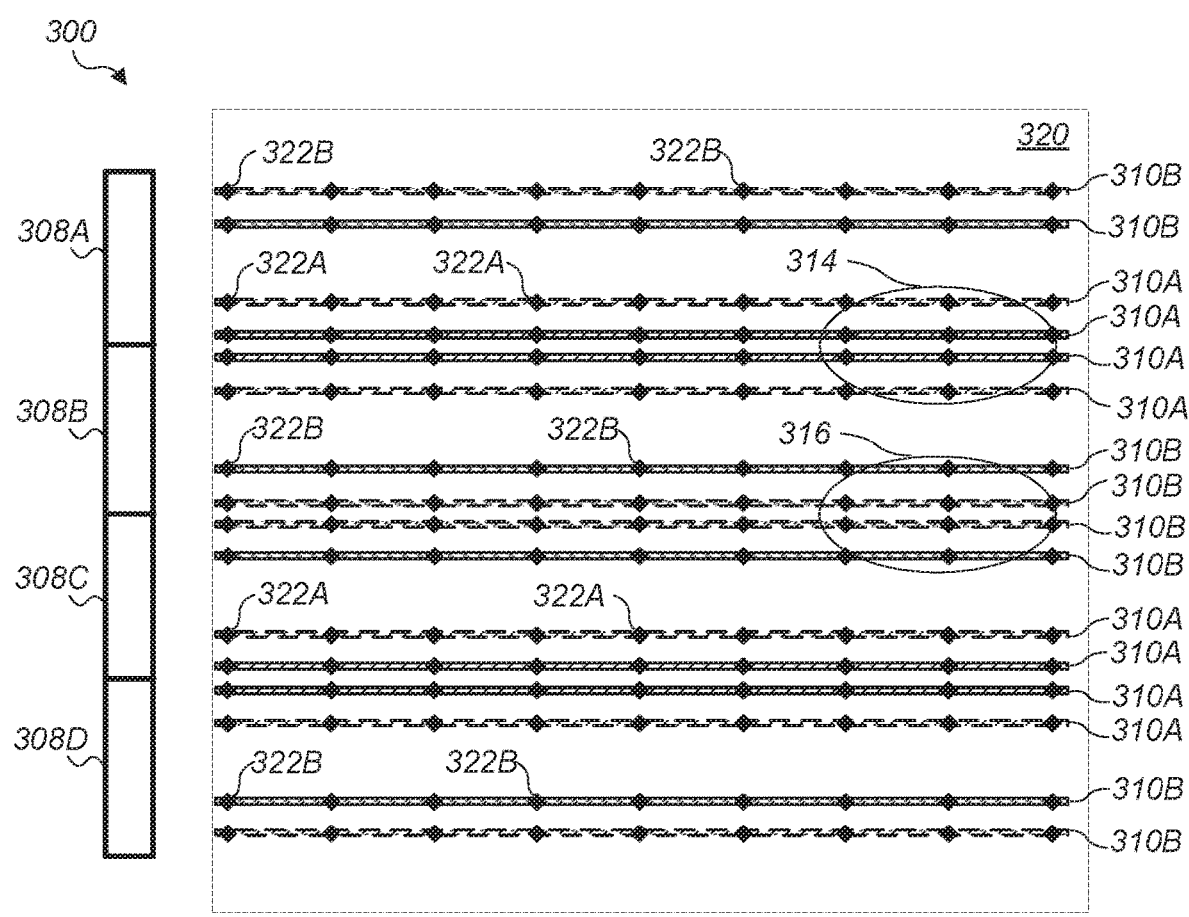
FIG. 7 depicts a top view representation of an embodiment of a third metal layer in an integrated circuit layout.

FIG. 7 depicts a top view representation of an embodiment of third metal layer 320 in integrated circuit layout 300. In certain embodiments, third metal layer 320 has a substantially similar layout of tracks 310A and 310B as first metal layer 302, shown in FIG. 5. Third metal layer 320 may also include clusters 314 and 316 of tracks 310A and 310B, respectively.

In certain embodiments, via connections 322 are made to tracks 310A and 310B in third metal layer 320. Via connections 322 may be used to connect tracks to other metal layers above and/or below third metal layer 320. As shown in FIG. 7, via connections 322 are made to individual tracks 310A and/or 310B at one or more locations along the tracks. Providing individual via connections 322 along tracks 310A, 310B allows for connections to be made to the tracks where needed. Additionally, combinations of two or more via connections 322 may be connected to tie together power and/or ground connections as needed.

In certain embodiments, one or more routing tracks are placed between tracks 310A and/or tracks 310B in third metal layer 320. The routing tracks are not shown for simplicity in the drawing. It is to be understood that a varying number of routing tracks between tracks 310A and/or 310B may be used depending on a desired design for integrated circuit layout 300.

Figure 8:
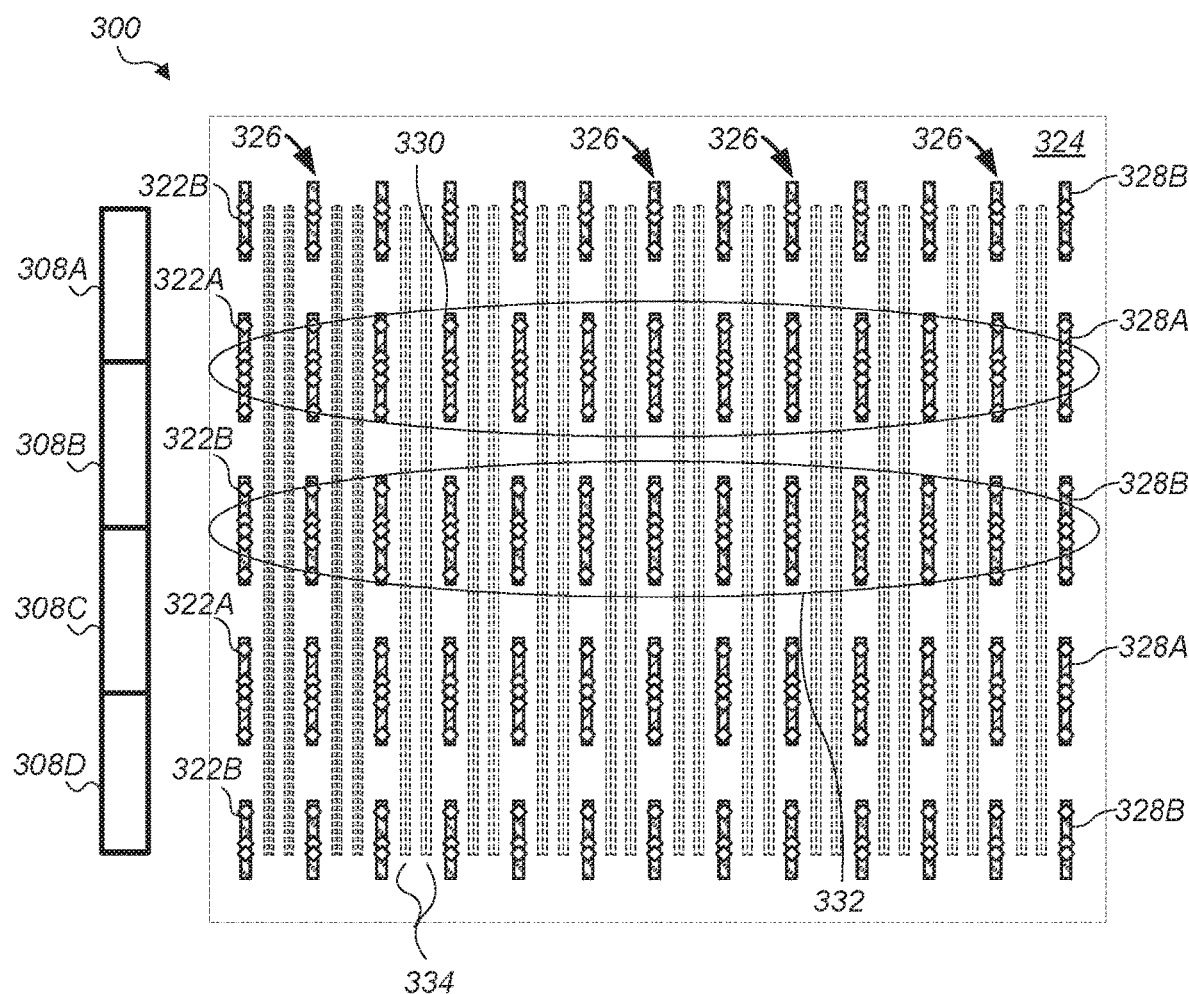
FIG. 8 depicts a top view representation of an embodiment of a fourth metal layer in an integrated circuit layout.

FIG. 8 depicts a top view representation of an embodiment of fourth metal layer 324 in integrated circuit layout 300. Fourth metal layer 324 may include tracks 326. Tracks 326 may be oriented perpendicular to tracks 310A and 310B in third metal layer 320. In certain embodiments, tracks 326 include separate metal sections 328 along the length of the tracks. For example, tracks 326 and metal sections 328 may be substantially similar to tracks 204 and metal sections 206, depicted in FIGS. 3A and 3B. Metal sections 328 may be electrically isolated from each other along the length of tracks 326. Thus, tracks 326 may be single metal rails "cut" or otherwise separated along their length to form separate metal sections 328. Cutting a single metal rail (e.g., track) along its length forms separate metal sections 328 that are shared along the single metal rail.

In certain embodiments, metal sections 328 along track 326 alternate between different types of connections along the track. For example, metal sections 328 may alternate between metal sections 328A and metal sections 328B. Alternating rows of metal sections 328A and 328B across metal layer 324 may form bundled rows of the metal sections. For example, as shown in FIG. 8, oval 330 includes a bundled row of metal sections 328A and oval 332 includes a bundled row of metal sections 328B. Each bundled row includes one metal section 328 along each track 326 in fourth metal layer 324. Having multiple metal sections 328 in each bundled row may provide redundant connection to perpendicular tracks in other metal layers above and/or below fourth metal layer 324.

In some embodiments, metal sections 328A connect to power tracks in other metal layers while metal sections 328B connect to ground tracks in other metal layers. For example, metal sections 328A may connect to tracks 310A in third metal layer 320, shown in FIG. 7. Metal sections 328A may be connected to tracks 310A using via connections 322A. Metal sections 328B may connect to tracks 310B in third metal layer 320. Metal sections 328B may be connected to tracks 310B using via connections 322B.

In certain embodiments, as shown in FIG. 8, metal sections 328A and/or metal sections 328B straddle or overlap between adjacent cell rows 308. For example, metal sections 328A may straddle cell rows 308A and 308B and metal sections 328B may straddle cell rows 308B and 308C. Additionally, metal sections 328A and/or metal sections 328B may be positioned over the clusters of corresponding tracks 310A and/or tracks 310B that straddle cell rows in third metal layer 320 (e.g., the clusters of tracks represented by ovals 314 and 316, shown in FIG. 7). Thus, metal sections 328A and/or metal sections 328B in fourth metal layer 324 may be used to strap or staple together (e.g., electrically connect together) the underlying tracks 310A and/or 310B in the clusters of third metal layer 320. In certain embodiments, metal sections 328A and/or metal sections 328B strap together all four of the underlying tracks 310A and/or 310B. In some embodiments, metal sections 328A and/or metal sections 328B strap together fewer of the underlying tracks 310A and/or 310B. For example, a metal section may only strap together two of the underlying tracks, which may or may not be in the same cell row. In some embodiment, the number of underlying tracks strapped together is determined by providing a selected number of via connections 322 between metal sections 328 and the underlying tracks 310 as each via connection may separately connect to each of the underlying tracks.

In certain embodiments, one or more routing tracks are placed between tracks 310A and/or tracks 310B in third metal layer 320. As shown in FIG. 8, two routing tracks 334 are placed between tracks 326. The number of routing tracks 334 between tracks 326 may, however, vary depending on a desired design for integrated circuit layout 300.

Figure 9:
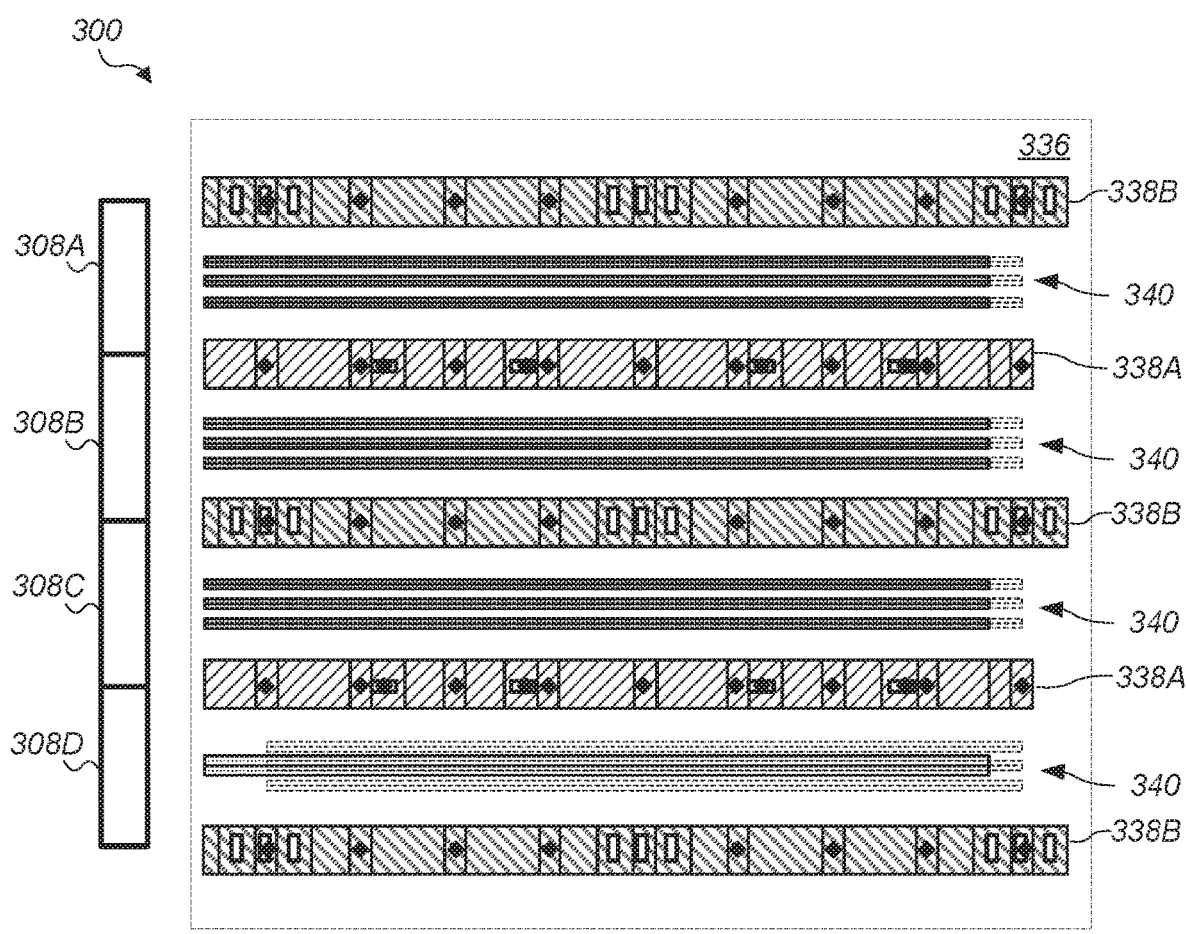
FIG. 9 depicts a top view representation of an embodiment of a fifth metal layer in an integrated circuit layout.

FIG. 9 depicts a top view representation of an embodiment of fifth metal layer 336 in integrated circuit layout 300. In certain embodiments, fifth metal layer 336 is a standard set of cell rows 308. For example, metal tracks 338 may be power metal tracks 338A or ground metal tracks 338B positioned on the boundary of each cell row. Power metal tracks 338A and ground metal tracks 338B may be alternated in fifth metal layer 336. In some embodiments, metal tracks 338 are double width tracks or "side-by-side" tracks with portions of the tracks in each cell row (e.g., the tracks straddle the boundary of the cell rows). In certain embodiments, routing tracks 340 are positioned between tracks 338 inside each of cell rows 308.

Figure 10:
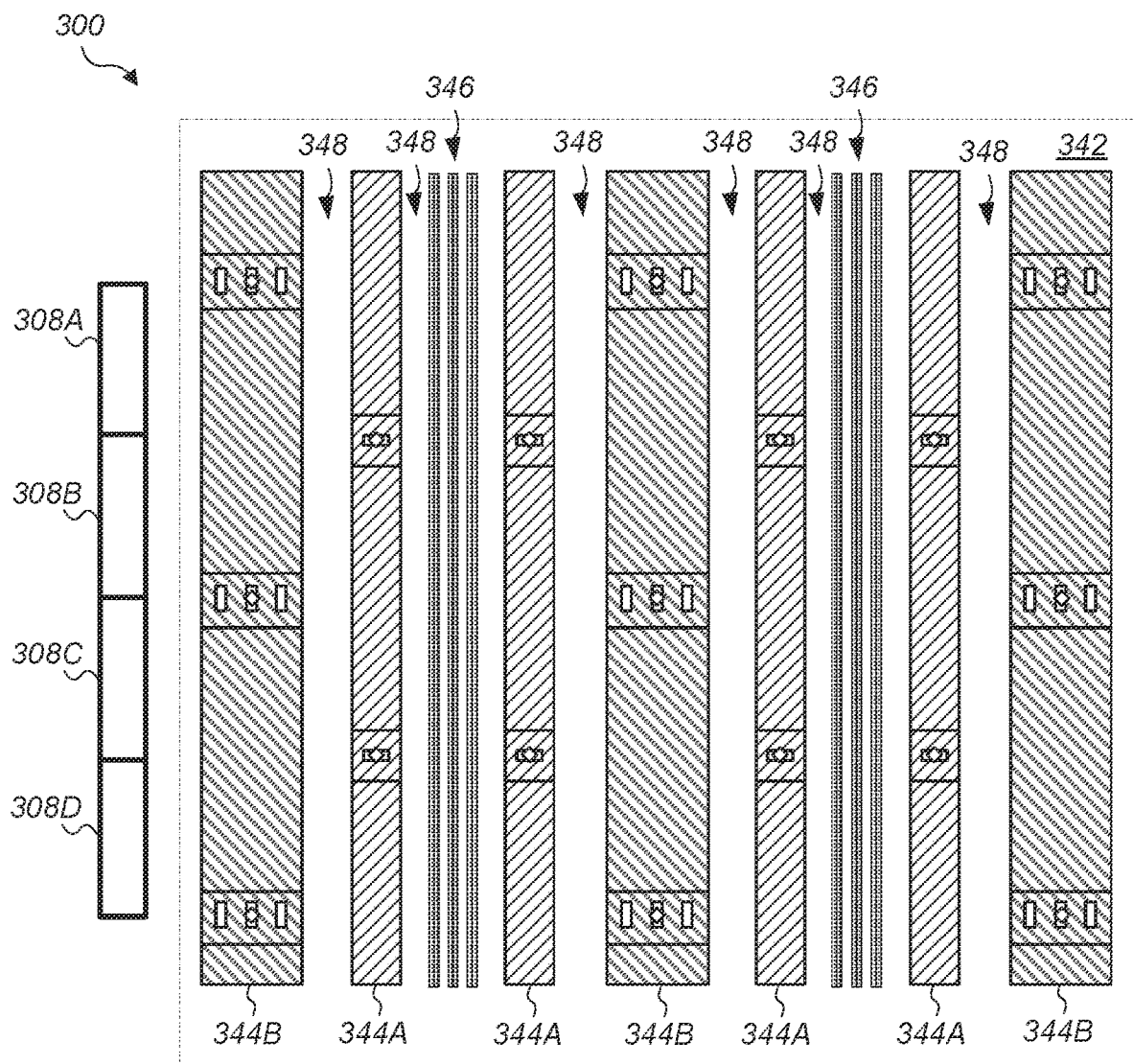
FIG. 10 depicts a top view representation of an embodiment of a sixth metal layer in an integrated circuit layout.

FIG. 10 depicts a top view representation of an embodiment of sixth metal layer 342 in integrated circuit layout 300. Sixth metal layer 342 may include metal tracks 344A and metal tracks 344B. In certain embodiments, metal tracks 344A are single width metal tracks and metal tracks 344B are double width metal tracks. In certain embodiments, at least one metal track 344A is placed adjacent to (or next to) at least one metal track 344B inside layout 300 (or inside a power grid cell in the layout).

In some embodiments, as shown in FIG. 10, metal tracks 344A are placed on either side of metal track 344B and in between routing tracks 346. For example, metal track 344B is at the center of FIG. 10 with metal tracks 344A on either side and routing tracks 346 on the outside of metal tracks 344B. Thus, metal track 344B and metal tracks 344B are positioned inside routing tracks 346. Routing tracks 346 may be, for example, signal routing tracks. Routing tracks 346 may, however, be optionally placed in layout 300. For example, in some embodiments, routing tracks 346 may be positioned in between other pairs of metal tracks 344A and 344B or one or more of the routing tracks may be absent from layout 300.

In certain embodiments, metal layer 342 includes insulating material 348 between metal tracks 344A and 344B (with or without routing tracks 346 being between the metal tracks). Insulating material 348 may be, for example, oxide or another electrically insulating material. Insulating material 348 may electrically isolate metal tracks 344A and 344B even though the metal tracks are adjacent or next to each other in metal layer 342.

Having metal track 344A and metal track 344B adjacent to or next to each other in layout 300 with insulating material 348 between the metal tracks creates capacitance in the layout (e.g., creates capacitance in the power grid) when different voltages are used on the metal tracks (e.g., when the voltages are power and ground). Thus, each pair of metal tracks 344A and metal tracks 344B that are adjacent to each other without routing tracks 346 create built-in capacitance in layout 300. This built-in capacitance in layout 300 (e.g., in the power grid) may reduce or eliminate the need for decoupling capacitors to be used in an integrated circuit using layout 300. In certain embodiments, layout 300 may be designed with metal tracks 344A and metal tracks 344B adjacent to or next to each other in locations where decoupling capacitors might be needed.

In certain embodiments, metal tracks 344A are power tracks (Vdd) and metal tracks 344B are ground tracks (Vss). Thus, in the embodiment depicted in FIG. 10, the ground tracks (Vss) are double the width of the power tracks (Vdd). It is to be understood, however, that the widths and/or positioning of the power tracks and the ground tracks may be switched. For example, metal tracks 344A may be ground tracks and metal tracks 344B may be power tracks or the position of metal tracks 344A and metal tracks 344B may be switched in layout 300. Additionally, other voltage tracks may be contemplated in sixth metal layer 342 or any other metal layer in layout 300.

Figure 11:
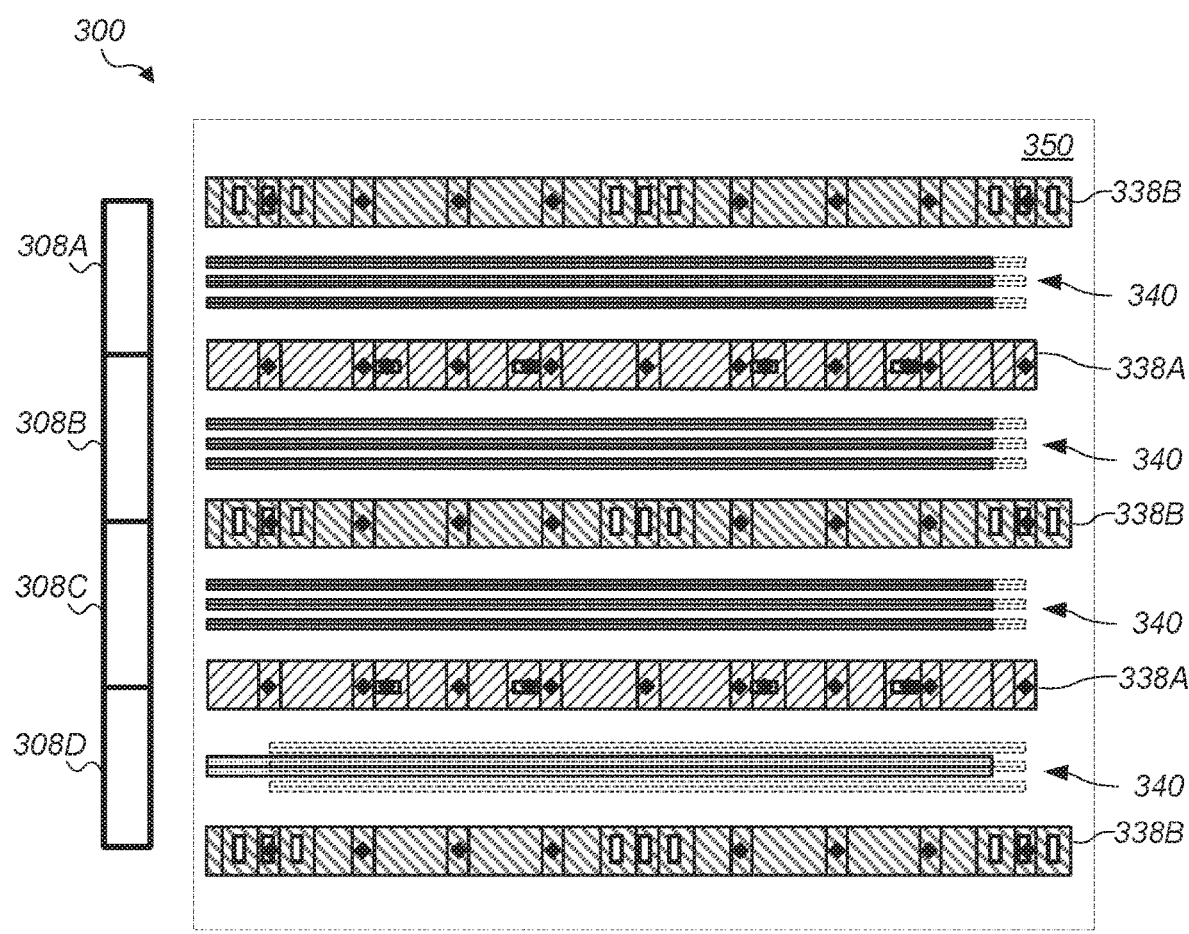
FIG. 11 depicts a top view representation of an embodiment of a seventh metal layer in an integrated circuit layout.

FIG. 11 depicts a top view representation of an embodiment of seventh metal layer 350 in integrated circuit layout 300. In certain embodiments, seventh metal layer 350 includes substantially similar metal tracks 338 and routing tracks 340 to fifth metal layer 336, shown in FIG. 9. In some embodiments, metal tracks 338 in seventh metal layer 350 may have a different width than metal tracks 338 in fifth metal layer 336.

Figure 12:
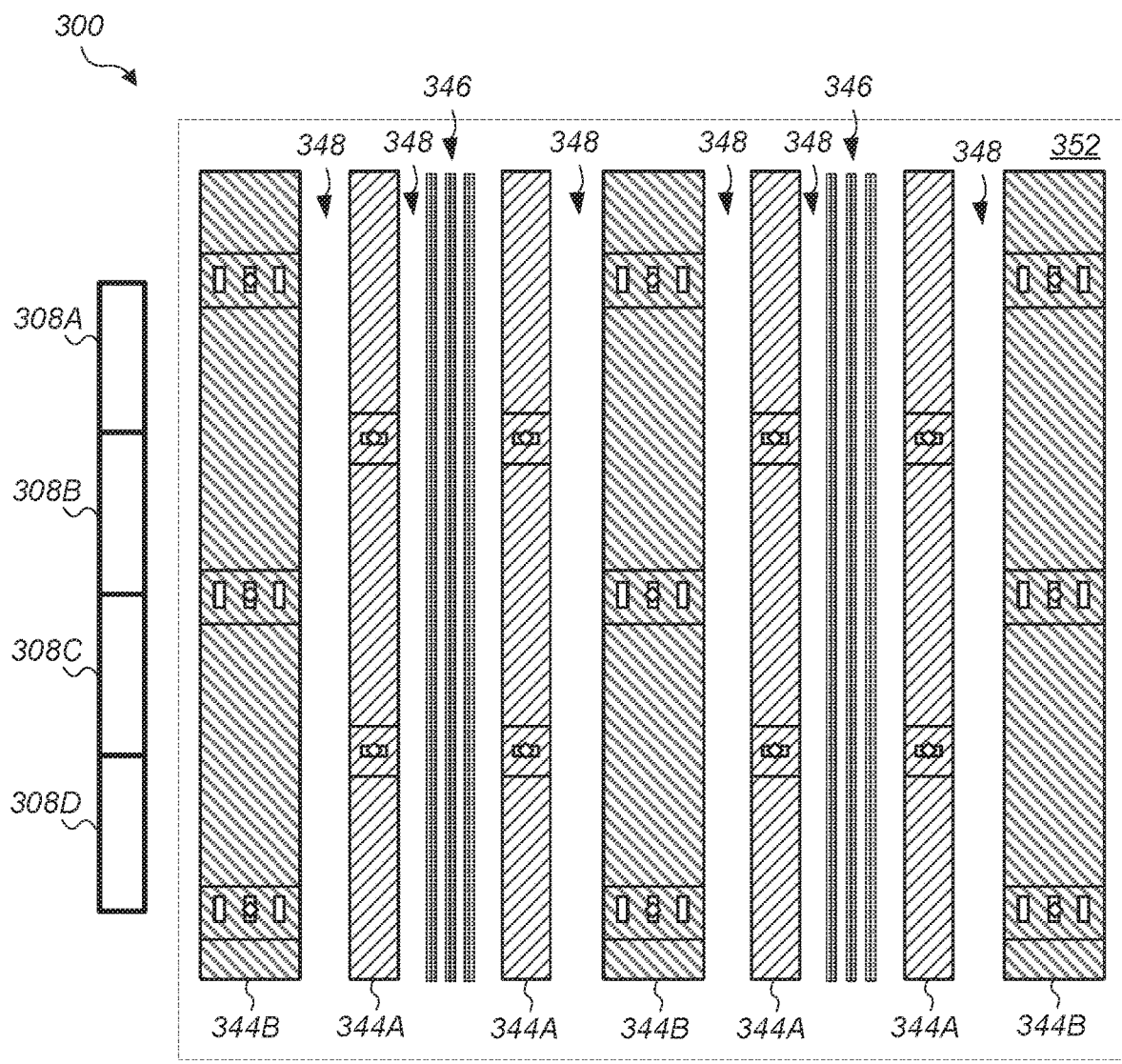
FIG. 12 depicts a top view representation of an embodiment of an eighth metal layer in an integrated circuit layout.

FIG. 12 depicts a top view representation of an embodiment of eighth metal layer 352 in integrated circuit layout 300. In certain embodiments, eighth metal layer 352 includes substantially similar metal tracks 344, routing tracks 346, and insulating material 348 to sixth metal layer 342, shown in FIG. 10.

Figure 13:
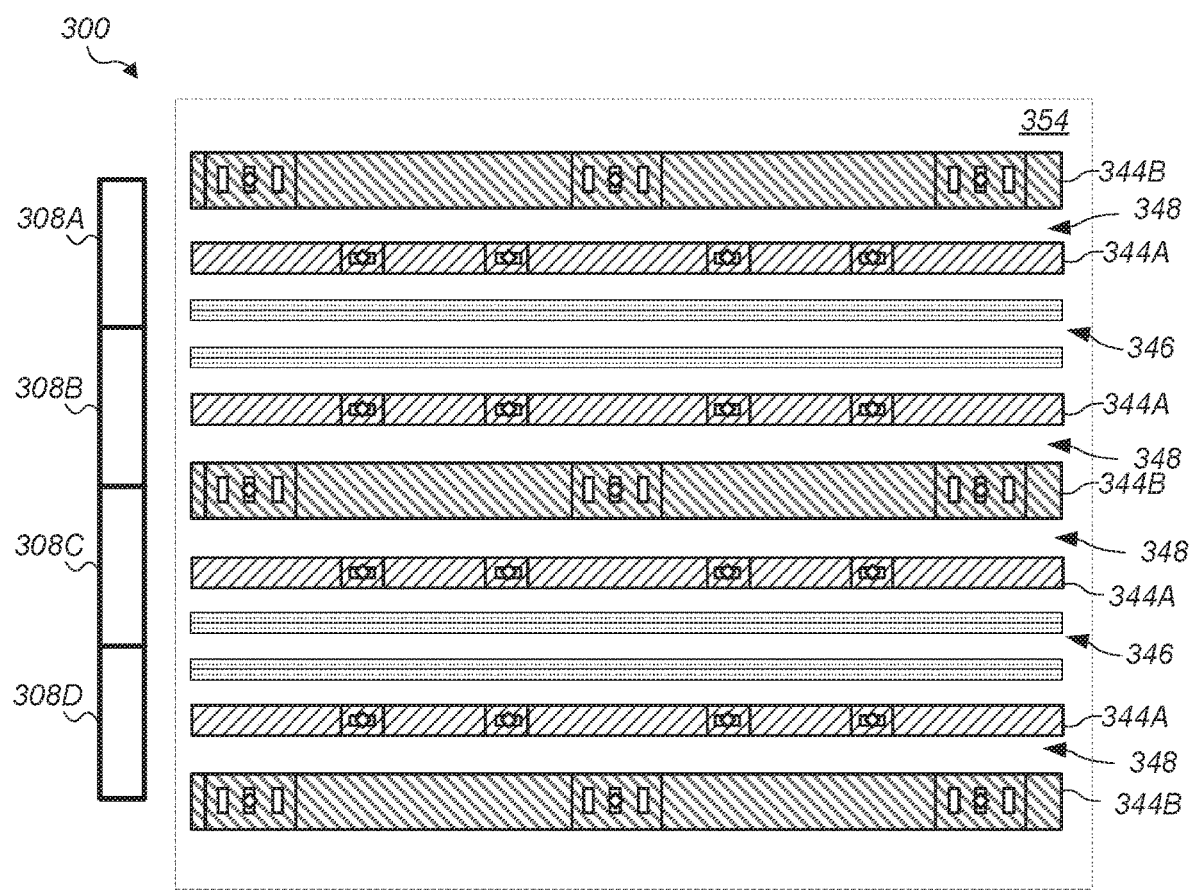
FIG. 13 depicts a top view representation of an embodiment of a ninth metal layer in an integrated circuit layout.

FIG. 13 depicts a top view representation of an embodiment of ninth metal layer 354 in integrated circuit layout 300. In certain embodiments, ninth metal layer 354 includes substantially similar metal tracks 344, routing tracks 346, and insulating material 348 to sixth metal layer 342, shown in FIGS. 10 and 12. However, the embodiments of metal tracks 344, routing tracks 346, and insulating material 348 depicted in FIG. 13 are oriented substantially perpendicular to the embodiments depicted in FIGS. 10 and 12. Additionally, routing tracks 346 may include fewer routing tracks such that there is not routing tracks along the boundary between cell rows 308 (e.g., the embodiment of routing tracks 346 depicted in FIG. 13 has only two tracks with a track on either side of the cell row boundaries).

While FIGS. 4-13 depict nine metal layers in integrated circuit layout 300 (e.g., the power grid layout for an integrated circuit), it is to be understood that additional metal layers may be included in the integrated circuit layout. The additional metal layers may include standard cell row designs (e.g., similar to the embodiment depicted in FIG. 9) or any cell row designs for the metal layers described herein. Additionally, it would be understood by those skilled in the art that while FIGS. 4-13 depict certain embodiments of cell row designs in certain metal layers that the cell row designs may be varied between metal layers within layout 300. For example, the cell row design for third metal layer 320 may be used in any other odd metal layer and/or the cell row design for fourth metal layer 324 may be used in any other even metal layer. Additionally, the cell row designs may be swapped between odd metal layers and even metal layers (e.g., the orientation of the cell row design in any metal layer may be perpendicular to its depicted orientation). Thus, an integrated circuit layout may be designed to have any combination of the cell row designs for the metal layers described herein without departing from the spirit and scope of the embodiments described herein and the appended claims.

In certain embodiments, one or more of the integrated circuit layouts described herein may be designed and/or implement using one or more processors (e.g., a computer processor) executing instructions stored on a non-transitory computer-readable medium. For example, layout 300, shown in FIGS. 4-13, may be designed and/or implemented using one or more steps performed by one or more processors executing instructions stored as program instructions in a computer readable storage medium (e.g., a non-transitory computer readable storage medium).

Various portions of layout 300, shown in FIGS. 4-13, may be designed and/or implemented by various electronic design automation (EDA) tools or computer aided design (CAD) tools. Examples of such EDA or CAD tools include Synopsys' Design Compiler® or Cadence's Encounter® RTL Compiler, Synopsis' IC Compiler, and others. These EDA or CAD tools may include one or more modules of computer program instructions that, when executed by a computer processor, cause the processor to generate an integrated circuit layout such as layout 300 and, more specifically, generate one or more files for use in fabrication of the integrated circuit.

Figure 14:
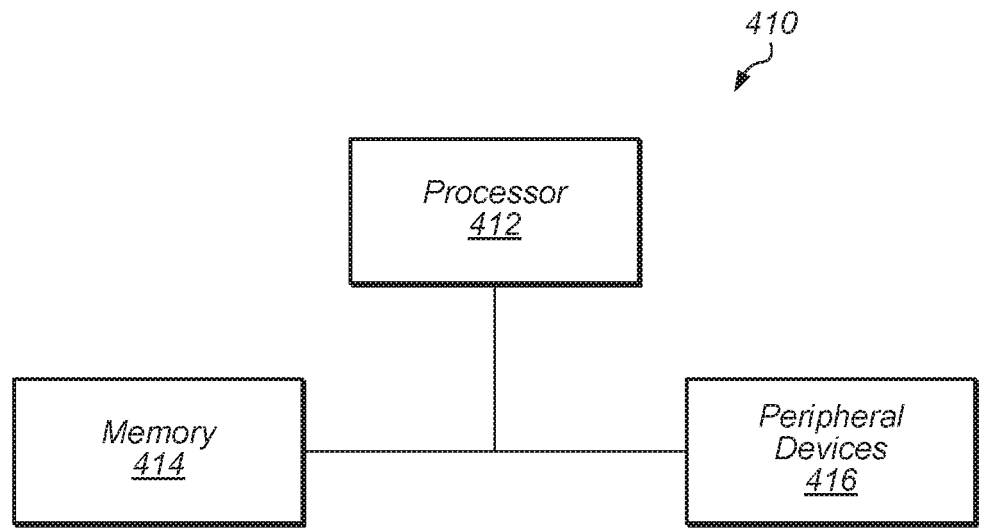
FIG. 14 depicts a block diagram of one embodiment of an exemplary computer system.

FIG. 14 depicts a block diagram of one embodiment of exemplary computer system 410. Exemplary computer system 410 may be used to implement one or more embodiments described herein. In some embodiments, computer system 410 is operable by a user to implement one or more embodiments described herein such as layout 300, shown in FIGS. 4-13. In the embodiment of FIG. 14, computer system 410 includes processor 412, memory 414, and various peripheral devices 416. Processor 412 is coupled to memory 414 and peripheral devices 416. Processor 412 is configured to execute instructions, including the instructions for process 200, which may be in software. In various embodiments, processor 412 may implement any desired instruction set. In some embodiments, computer system 410 may include more than one processor. Moreover, processor 412 may include one or more processors or one or more processor cores.

Processor 412 may be coupled to memory 414 and peripheral devices 416 in any desired fashion. For example, in some embodiments, processor 412 may be coupled to memory 414 and/or peripheral devices 416 via various interconnect. Alternatively or in addition, one or more bridge chips may be used to coupled processor 412, memory 414, and peripheral devices 416.

Memory 414 may comprise any type of memory system. For example, memory 414 may comprise DRAM, and more particularly double data rate (DDR) SDRAM, RDRAM, etc. A memory controller may be included to interface to memory 414, and/or processor 412 may include a memory controller. Memory 414 may store the instructions to be executed by processor 412 during use, data to be operated upon by the processor during use, etc.

Figure 15:
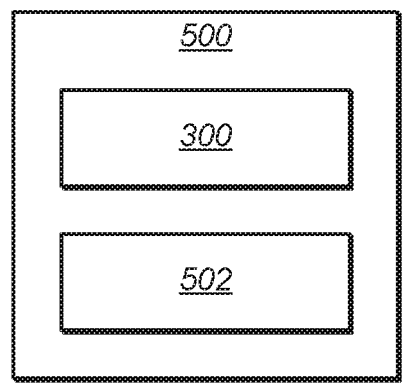
FIG. 15 depicts a block diagram of one embodiment of a computer accessible storage medium.

Peripheral devices 416 may represent any sort of hardware devices that may be included in computer system 410 or coupled thereto (e.g., storage devices, optionally including computer accessible storage medium 500, shown in FIG. 15, other input/output (I/O) devices such as video hardware, audio hardware, user interface devices, networking hardware, etc.).

Turning now to FIG. 15, a block diagram of one embodiment of computer accessible storage medium 500 including one or more data structures representative of layout 300 (depicted in FIGS. 4-13) included in an integrated circuit design and one or more code sequences 502 representative of a process to form layout 300. Each code sequence may include one or more instructions, which when executed by a processor in a computer, implement the operations described for the corresponding code sequence.

Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 500 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the database of the layout 300 carried on the computer accessible storage medium 500 may be a database which can be read by a program and used, directly or indirectly, to fabricate the hardware comprising the layout 300. For example, the database may be a behavioral-level description or register-transfer level (RTL) description of the hardware functionality in a high level design language (HDL) such as Verilog or VHDL. The description may be read by a synthesis tool which may synthesize the description to produce a netlist of an integrated circuit for use in integrated circuit layout generation. The netlist may then be placed and routed to produce a data set describing geometric shapes to be applied to masks. The masks may then be used in various semiconductor fabrication steps to produce a semiconductor circuit or circuits corresponding to the layout 300. Alternatively, the database on the computer accessible storage medium 500 may be the netlist (with or without a synthesis library) or the data set, as desired.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed:

1. An integrated circuit, comprising:
a first metal layer comprising a first plurality of unidirectional metal tracks, wherein the first plurality of unidirectional metal tracks comprises a first metal track at a first voltage and a second metal track at a second voltage;
an insulating layer on the first metal layer; and
a second metal layer comprising a second plurality of unidirectional metal tracks on the insulating layer, wherein the second plurality of unidirectional metal tracks have a pitch distance between one another and are substantially perpendicular to the first plurality of metal tracks, wherein a third metal track of the second plurality of unidirectional metal tracks comprises a first plurality of separate metal sections that are electrically isolated from each other, a first separate metal section in the third metal track being connected to the first metal track at the first voltage, and a second separate metal section in the third metal track being connected to the second metal track at the second voltage such that the first voltage and the second voltage are routed within the third metal track.

2. The integrated circuit of claim 1, wherein:
the first separate metal section in the third metal track is connected to the first metal track with a first via through the insulating layer; and
the second separate metal section in the third metal track is connected to the second metal track with a second via through the insulating layer; and
wherein the first via and the second via are located within the third metal track.

3. The integrated circuit of claim 2, wherein a distance between the first via and the second via is at least a distance between two adjacent metal tracks of the first plurality of unidirectional metal tracks of the first metal layer.

4. The integrated circuit of claim 1, wherein a fourth metal track of the second plurality of unidirectional metal tracks of the second metal layer comprises a second plurality of separate metal sections that are electrically isolated from each other, a first separate metal section in the fourth metal track being connected to the first metal track at the first voltage, and a second separate metal section in the fourth metal track being connected to the second metal track at the second voltage such that the first voltage and the second voltage are routed within the fourth metal track using vias that have a distance between them that is at least a distance between two adjacent metal tracks of the first plurality of unidirectional metal tracks of the first metal layer.

5. The integrated circuit of claim 1, wherein the first metal track at the first voltage is shared between two standard cells of the integrated circuit.

6. The integrated circuit of claim 1, wherein a portion of the first metal track at the first voltage connected to the first separate metal section in the third metal track and a portion of the second metal track at the second voltage connected to the second separate metal section in the third metal track are located in a standard cell of the integrated circuit.

7. The integrated circuit of claim 1, wherein the first plurality of unidirectional metal tracks comprises a fifth metal track at the first voltage connected to the first separate metal section in the third metal track, wherein the fifth metal track at the first voltage is located in a different cell of the integrated circuit than the first metal track at the first voltage.

8. The integrated circuit of claim 1, further comprising:
a third metal layer above at least the second metal layer, the third metal layer comprising:
a first metal rail at the first voltage;
a second metal rail adjacent to the first metal rail, the second metal rail being at the second voltage; and
an electrically insulating material located between the first metal rail and the second metal rail creating a built-in capacitance between the first metal rail and the second metal rail to be used in place of a decoupling capacitor in a location of the first metal rail and the second metal rail.

9. The integrated circuit of claim 1, wherein the second metal layer is a metal layer used for metal pins of standard cell layouts.

10. The integrated circuit of claim 8, further comprising a third metal rail adjacent to the second metal rail and on an opposite side of the second metal rail from the first metal rail in the third metal layer, the third metal rail being at the first voltage, wherein the first metal rail and the third metal rail comprise single width metal rails and the second metal rail comprises a double width metal rail.

11. The integrated circuit of claim 10, further comprising a first routing track and a second routing track in the third metal layer, wherein the first routing track is positioned adjacent to the first metal rail on an opposite side of the first metal rail from the second metal rail, and wherein the second routing track is positioned adjacent to the third metal rail on an opposite side of the third metal rail from the second metal rail.

12. A method for fabricating an integrated circuit comprising:
placing a first metal layer comprising a first plurality of unidirectional metal tracks, wherein the first plurality of unidirectional metal tracks comprises a first metal track at a first voltage and a second metal track at a second voltage;
depositing an insulating layer formed on the first metal layer; and
placing a second metal layer comprising a second plurality of unidirectional metal tracks on the insulating layer, wherein the second plurality of unidirectional metal tracks have a pitch distance between one another and are substantially perpendicular to the first plurality of metal tracks, wherein a third metal track of the second plurality of unidirectional metal tracks comprises a first plurality of separate metal sections that are electrically isolated from each other, a first separate metal section in the third metal track being connected to the first metal track at the first voltage, and a second separate metal section in the third metal track being connected to the second metal track at the second voltage such that the first voltage and the second voltage are routed within the third metal track.

13. The method as recited in claim 12, further comprising:
connecting, with a first via through the insulating layer, the first separate metal section in the third metal track to the first metal track; and
connecting, with a second via through the insulating layer, the second separate metal section in the third metal track to the second metal track, wherein the first via and the second via are located within the third metal track.

14. The method as recited in claim 13, wherein a distance between the first via and the second via is at least equal to a distance between two adjacent metal tracks of the first plurality of unidirectional metal tracks of the first metal layer.

15. The method as recited in claim 12, further comprises forming the first metal track at the first voltage to be shared between two standard cells of an integrated circuit.

16. The method as recited in claim 12, further comprises forming a third metal layer above at least the second metal layer, the third metal layer comprising:
a first metal rail at the first voltage;
a second metal rail adjacent to the first metal rail, the second metal rail being at the second voltage; and
an electrically insulating material located between the first metal rail and the second metal rail creating a built-in capacitance between the first metal rail and the second metal rail to be used in place of a decoupling capacitor in a location of the first metal rail and the second metal rail.

17. The method as recited in claim 16, further comprises forming a third metal rail adjacent to the second metal rail and on an opposite side of the second metal rail from the first metal rail in the third metal layer, the third metal rail being at the first voltage, wherein the first metal rail and the third metal rail comprise single width metal rails and the second metal rail comprises a double width metal rail.

18. The method as recited in claim 17, further comprises forming a first routing track and a second routing track in the third metal layer, wherein the first routing track is positioned adjacent to the first metal rail on an opposite side of the first metal rail from the second metal rail, and wherein the second routing track is positioned adjacent to the third metal rail on an opposite side of the third metal rail from the second metal rail.

19. The method as recited in claim 12, wherein a portion of the first metal track at the first voltage connected to the first separate metal section in the third metal track and a portion of the second metal track at the second voltage connected to the second separate metal section in the third metal track are located in a standard cell of the integrated circuit.

20. The method of claim 12, wherein the first plurality of unidirectional metal tracks comprises a fifth metal track at the first voltage connected to the first separate metal section in the third metal track, wherein the fifth metal track at the first voltage is located in a different cell of the integrated circuit than the first metal track at the first voltage.

* * * * *